United States Patent
Deguchi

(10) Patent No.: US 8,692,536 B2
(45) Date of Patent: Apr. 8, 2014

(54) SWITCHING REGULATOR WITH SHORT-CIRCUIT DETECTION CIRCUIT

(71) Applicant: Seiko Instruments Inc., Chiba (JP)

(72) Inventor: Michiyasu Deguchi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 13/761,868

(22) Filed: Feb. 7, 2013

(65) Prior Publication Data

US 2013/0207633 A1    Aug. 15, 2013

(30) Foreign Application Priority Data

Feb. 13, 2012    (JP) .................................. 2012-028735

(51) Int. Cl.
*G05F 1/00*    (2006.01)

(52) U.S. Cl.
USPC .......................................... 323/288; 323/282

(58) Field of Classification Search
USPC ......... 323/242, 288, 326, 282, 284, 285, 351; 361/18, 93.1
See application file for complete search history.

(56) References Cited

U.S. PATENT DOCUMENTS

| | | | | |
|---|---|---|---|---|
| 7,443,641 B2* | 10/2008 | Suzuki | ............................ | 361/18 |
| 2006/0076941 A1* | 4/2006 | Ishii | ............................... | 323/282 |
| 2010/0109626 A1* | 5/2010 | Chen | .............................. | 323/282 |

FOREIGN PATENT DOCUMENTS

JP    05-328711 A    12/1993

* cited by examiner

*Primary Examiner* — Timothy J Dole
*Assistant Examiner* — Ivan Laboy Andino
(74) *Attorney, Agent, or Firm* — Brinks Gilson & Lione

(57) ABSTRACT

Provided is a switching regulator including a circuit for detecting a short-circuit state easily and reliably, without the need of an adjustment step such as trimming. In accordance with a drive signal of a power switching element of the switching regulator, a discharge circuit is controlled. When the power switching element is short-circuited and becomes the ON state all the time, the discharge circuit stops its operation, and a capacitor is continuously charged. A voltage detection circuit detects that a charge voltage of the capacitor has reached a predetermined potential, to thereby detect the short-circuit state.

4 Claims, 4 Drawing Sheets

US 8,692,536 B2

SWITCHING REGULATOR WITH SHORT-CIRCUIT DETECTION CIRCUIT

RELATED APPLICATIONS

This application claims priority under 35 U.S.C. §119 to Japanese Patent Application No. 2012-028735 filed on Feb. 13, 2012, the entire content of which is hereby incorporated by reference.

BACKGROUND OF THE INVENTION

1. Field of the Invention

The present invention relates to a switching regulator for outputting a constant voltage, and more particularly, to a switching regulator including a short-circuit detection circuit.

2. Description of the Related Art

Switching regulators are used as a voltage supply source for a circuit in various kinds of electronic devices. The function of the switching regulator is to output a constant voltage to an output terminal irrespective of fluctuations in input terminal voltage. It is important to operate a short-circuit protection circuit for detecting that some abnormality has occurred in the output terminal and a current supplied to a load has increased to exceed a maximum current (see, for example, Japanese Patent Application Laid-open No. Hei 5-328711).

FIG. 3 illustrates a circuit diagram of a conventional switching regulator including a short-circuit detection circuit. The conventional switching regulator includes an output voltage dividing circuit 20 for dividing a voltage of an output terminal Out, a reference voltage circuit 4 for outputting a reference voltage Vref, an error amplifier 1 for comparing a divided voltage FB to the reference voltage Vref, a triangle wave oscillation circuit 3 for outputting a triangle wave signal Vramp, a PWM comparator circuit 2 for comparing an output voltage of the error amplifier 1 to the triangle wave signal Vramp and outputting a pulse signal, a buffer circuit 5 for amplifying the output signal of the PWM comparator 2, a short-circuit detection circuit 100 for detecting the flow of an overcurrent to the output terminal Out, a power switching element 200, an inductance 201, a diode 202, and a smoothing capacitor 203. The short-circuit detection circuit 100 includes a second reference voltage circuit 102 and a comparator circuit 101.

The operation of the conventional switching regulator is described below. The conventional switching regulator operates under PWM control as shown in the figures.

The triangle wave signal Vramp output from the triangle wave oscillation circuit 3 has a constant frequency. The duty cycle of a signal Vpwm output from the PWM comparator 2 changes in accordance with increase and decrease in load current. The signal Vpwm controls a conduction time of the power switching element 200. Then, an output voltage Vout of the output terminal Out is maintained to a constant value.

FIG. 4 is a timing chart of the conventional switching regulator. Under a condition where the load current is constant as shown in a period t1, the duty cycle of the signal Vpwm is constant. When the load current increases as shown in a period t2, a voltage Verr output from the error amplifier 1 decreases, and the duty cycle of the signal Vpwm increases. When the load current further increases, and the voltage Verr falls below an amplitude lower limit of the triangle wave signal Vramp, the signal Vpwm continues to output a fixed value for bringing the power switching element 200 into the conductive state all the time.

In this case, a reference voltage Vref2 of the second reference voltage circuit 102 is set to the lower voltage side than the amplitude lower limit of the triangle wave signal Vramp. When the output terminal Out reaches the short-circuit state as shown in a period t3, the voltage Verr further decreases. When the voltage Verr falls below the reference voltage Vref2, the short-circuit detection circuit 100 detects the short-circuit state, and a voltage SD output from the comparator circuit 101 is inverted to L level. The buffer circuit 5 is turned OFF in response to the voltage SD of L level, thereby bringing the power switching element 200 into the non-conductive state. In this way, the short-circuit detection circuit 100 prevents the switching regulator from continuing to allow an overcurrent to flow.

However, in the case of using the circuit for comparing the output voltage Verr of the error amplifier to the reference voltage Vref2, it is necessary to set the reference voltage Vref2 to be out of the amplitude range of the triangle wave signal Vramp and within the amplitude range of the output voltage of the error amplifier. This requires an operation of adjusting the reference voltage Vref2, such as trimming, thus leading to the disadvantage of increased cost.

SUMMARY OF THE INVENTION

The present invention has been devised in order to solve the above-mentioned problem, and realizes a switching regulator including a high-precision short-circuit detection circuit by a simple circuit.

In order to solve the conventional problem, the switching regulator including the short-circuit detection circuit according to the present invention has the following configuration.

According to an exemplary embodiment of the present invention, there is provided a switching regulator, including a short-circuit detection circuit, for controlling a power switching element based on an output signal of a PWM comparator, in which the short-circuit detection circuit includes: a capacitor; a charge circuit for charging the capacitor; a discharge circuit for discharging the capacitor; and a voltage detection circuit for monitoring a charge voltage of the capacitor, and in which the discharge circuit is controlled by a signal for controlling the power switching element, and the discharge circuit stops a discharge operation in a period during which the power switching element supplies energy to an output terminal of the switching regulator.

Even when the detection level precision of the voltage detection circuit is very low, there is no problem in terms of operation, and hence the voltage detection circuit can be formed of a simple circuit such as an inverter.

According to the switching regulator including the short-circuit detection circuit of the present invention, there are effects that the switching regulator can be formed of a simple circuit without the need of a high-precision reference voltage and that adjustment means such as trimming can be omitted.

DETAILED DESCRIPTION OF THE PREFERRED EMBODIMENT

Figure 1:
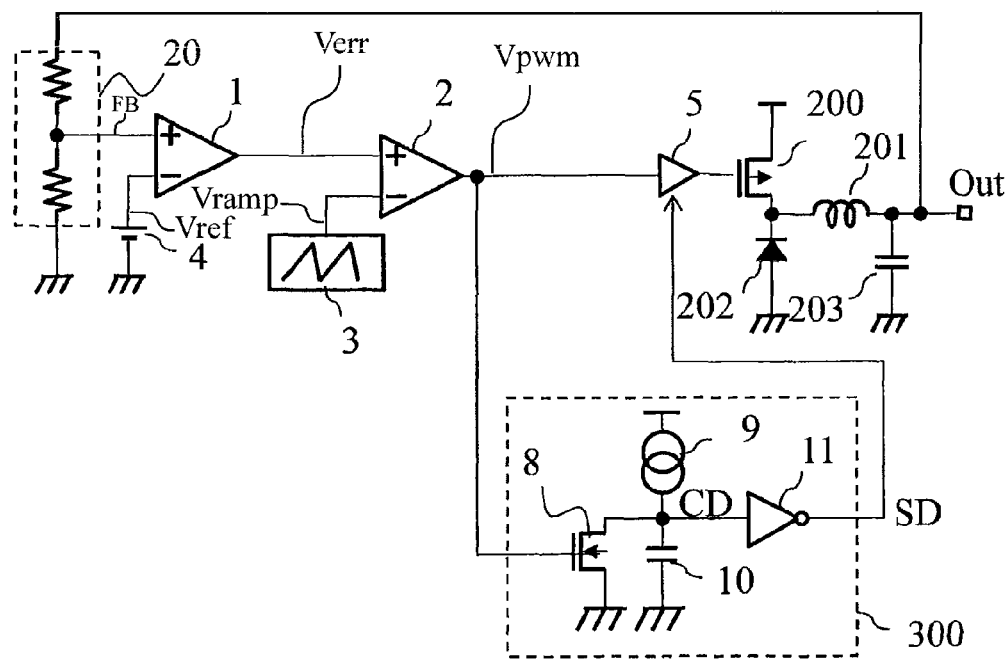
FIG. 1 is a circuit diagram of a switching regulator including a short-circuit detection circuit according to an embodiment of the present invention.

FIG. 1 is a circuit diagram of a switching regulator according to an embodiment of the present invention.

The switching regulator in this embodiment includes an output voltage dividing circuit 20, a reference voltage circuit 4, an error amplifier 1, a PWM comparator 2, a triangle wave oscillation circuit 3, an output buffer 5, a power switching element 200, an inductance 201, a diode 202, a smoothing capacitor 203, and a short-circuit detection circuit 300.

The power switching element 200 has a control terminal connected to an output terminal of the output buffer 5, thereby being controlled by an output voltage of the output buffer 5. The inductance 201 is connected between the power switching element 200 and an output terminal Out. The diode 202 is connected between one end of the inductance 201 and a ground terminal, and the smoothing capacitor 203 is connected between the other end of the inductance 201 and the ground terminal.

The output voltage dividing circuit 20 is connected to the output terminal Out. The output voltage dividing circuit 20 divides an output voltage Vout and outputs a divided voltage FB. The error amplifier 1 inputs the divided voltage FB and a reference voltage Vref output from the reference voltage circuit 4, and amplifies a difference voltage therebetween to be output as a voltage Verr. The triangle wave oscillation circuit 3 outputs a triangle wave signal Vramp at a constant frequency. The PWM comparator 2 inputs the triangle wave signal Vramp and the voltage Verr, and outputs a pulse signal Vpwm. The output buffer 5 amplifies the signal Vpwm, and outputs a signal for driving the power switching element 200. The short-circuit detection circuit 300 detects a short-circuit state of the output terminal Out based on the signal Vpwm of the PWM comparator 2, and outputs a short-circuit state detection signal SD to the output buffer 5. The output buffer 5 controls the drive of the power switching element 200 in response to the short-circuit state detection signal SD. The short-circuit detection circuit 300 includes a capacitor 10, a charge circuit 9 for charging the capacitor 10, a discharge circuit 8 for discharging the capacitor 10, and a voltage detection circuit 11 for monitoring a voltage CD of the capacitor 10.

Figure 2:
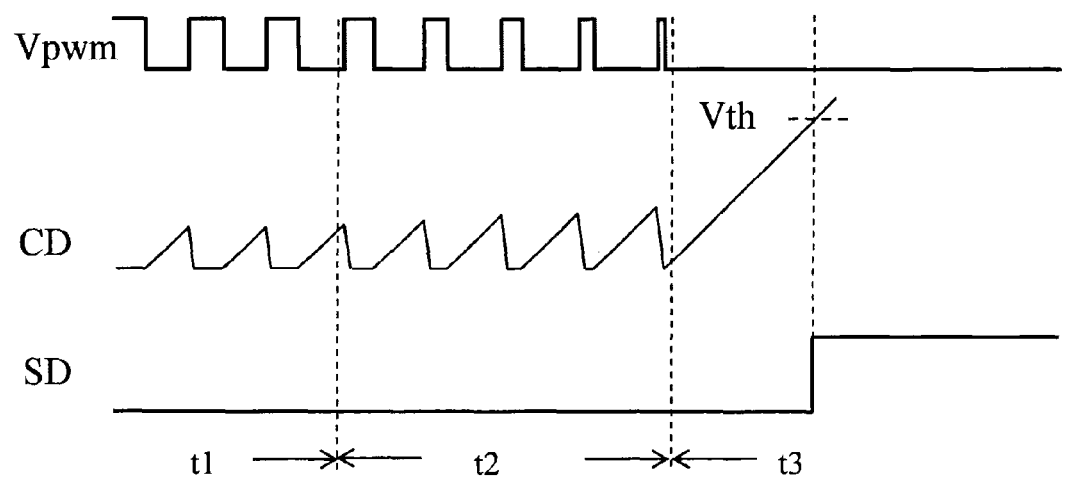
FIG. 2 is a timing chart of the switching regulator according to the embodiment of the present invention.
Figure 3:
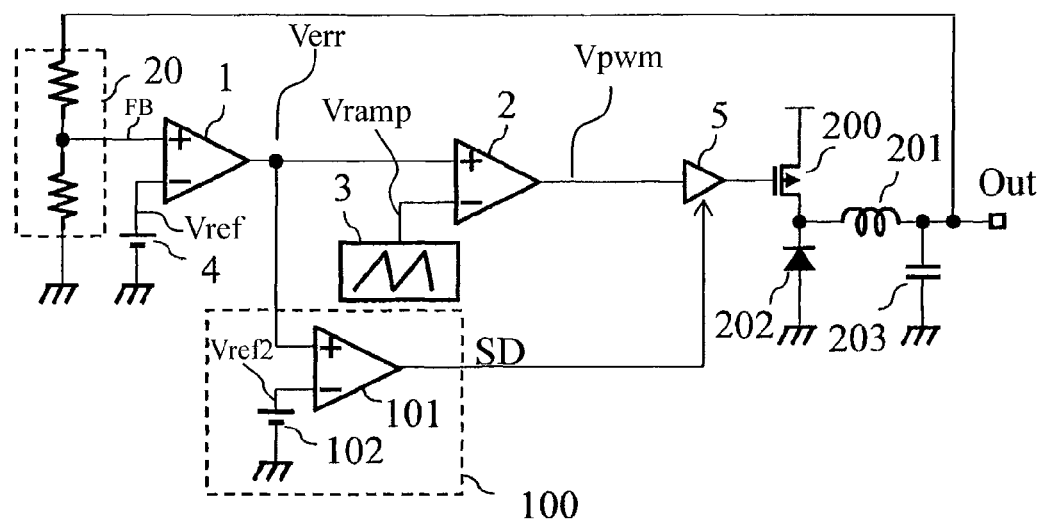
FIG. 3 is a circuit diagram of a conventional switching regulator including a short-circuit detection circuit.
Figure 4:
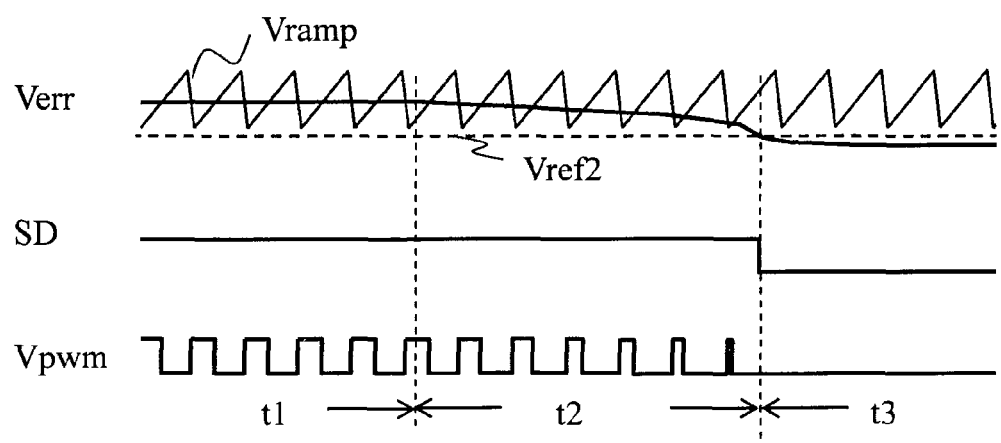
FIG. 4 is a timing chart of the conventional switching regulator.

The operation of the short-circuit detection circuit included in the switching regulator in this embodiment is described below with reference to FIG. 2. FIG. 2 is a timing chart of the switching regulator in this embodiment.

The discharge circuit 8 is controlled by the signal Vpwm for controlling the power switching element 200 of the switching regulator. Therefore, the discharge circuit 8 stops a discharge operation in a period during which the power switching element 200 supplies energy to the output terminal Out, and performs the discharge operation in a period during which the power switching element 200 does not supply energy to the output terminal Out. Therefore, in FIG. 2, the voltage CD of the capacitor 10 changes depending on the pulse width of the signal Vpwm.

Under a condition where a load current is constant as shown in a period t1, the duty cycle of the signal Vpwm is constant. When the load current increases as shown in a period t2, the voltage Verr output from the error amplifier 1 decreases, and the duty cycle of the signal Vpwm increases. In accordance therewith, the voltage CD of the capacitor 10 increases.

In a period t3, when the output terminal Out is short-circuited, the output voltage Vout decreases, and the power switching element 200 continues to supply energy to the output terminal all the time. In other words, the signal Vpwm maintains L level. Therefore, the discharge circuit 8 stops the discharge operation, and the capacitor 10 is charged by the charge circuit 9. When the terminal voltage CD of the capacitor 10 increases to reach a threshold voltage Vth of the voltage detection circuit 11, the voltage detection circuit 11 detects the short-circuit state, and inverts an output of a short-circuit state detection signal SD.

In this case, the threshold level Vth of the voltage detection circuit only needs to be set as appropriate so that the short-circuit of the output terminal Out may be detected. In other words, the threshold level Vth only needs to be set to a voltage equal to or higher than such a voltage that the capacitor 10 reaches when the capacitor 10 is charged for two or more periods (such as about ten periods) of the signal Vpwm. The upper limit of the threshold voltage Vth is determined by heat resistance of an element through which a large current flows at the time of short-circuit. In general, it is said that the element is not broken down unless a large current flows for longer than about several tens of milliseconds. In the case of a relatively slow operating frequency of 100 KHz, one period is 10μ seconds. When a heat resistance time of the element described above is supposed to be 10 m seconds, this heat resistance time corresponds to 1,000 periods in terms of period.

It follows that the setting value of the threshold voltage Vth only needs to be set to such a charge voltage of the capacitor 10 that the capacitor 10 reaches when the capacitor 10 is continued to be charged by the charge circuit 9 continuously for ten or more and 1,000 or less periods of the oscillation frequency. This means that there is no problem even if the setting precision of the threshold voltage Vth is very low, and the configuration of the voltage detection circuit 11 can be simplified. Thus, the voltage detection circuit 11 may be formed of a simple CMOS inverter, which arises no problem in terms of operation.

As described above, in the switching regulator in this embodiment, the short-circuit detection circuit 300 is configured by a circuit (for example, an inverter) for detecting the short-circuit of the output terminal Out based on the signal Vpwm. Thus, the short-circuit state can be detected to prevent an overcurrent of the switching regulator by a very simple circuit configuration without the need of an adjustment step such as trimming.

Besides, as a result of the simplified circuit, the function can be realized with a very small area, thus producing the cost reduction effect.

What is claimed is:

1. A switching regulator, comprising a short-circuit detection circuit, for controlling a power switching element based on an output signal of a PWM comparator, wherein the short-circuit detection circuit comprises: a capacitor; a charge circuit for charging the capacitor; a discharge circuit for discharging the capacitor; and a voltage detection circuit for monitoring a charge voltage of the capacitor, and wherein the discharge circuit is controlled by the output signal of the PWM comparator controlling the power switching element, and the discharge circuit stops a discharge operation in a period during which the power switching element supplies energy to an output terminal of the switching regulator.

2. A switching regulator according to claim 1, wherein a detection voltage of the voltage detection circuit is set to a voltage value equal to or more than such a voltage value that the capacitor reaches when the capacitor is continued to be charged by the charge circuit for a time period corresponding to at least two operating periods of the switching regulator.

3. A switching regulator according to claim 1, wherein the voltage detection circuit comprises a logic gate, and stops an output of the power switching element based on an output of the voltage detection circuit.

4. A switching regulator according to claim 2, wherein the voltage detection circuit comprises a logic gate, and stops an output of the power switching element based on an output of the voltage detection circuit.

* * * * *